US011472930B2

(12) United States Patent
Jurkovic et al.

(10) Patent No.: US 11,472,930 B2
(45) Date of Patent: Oct. 18, 2022

(54) RUBBER PELLET TREATMENT

(71) Applicant: NIKE, Inc., Beaverton, OR (US)

(72) Inventors: Dragan Jurkovic, Taichung (TW); Chun-Wei Huang, Lukang Town (TW); Eric Lee, Portland, OR (US); Liu I Huang, Taichung (TW); Shih Chi Tung, Puyan Township (TW); Wang Hsi Ming, Caotun Township (TW)

(73) Assignee: NIKE, Inc., Beaverton, OR (US)

( * ) Notice: Subject to any disclaimer, the term of this patent is extended or adjusted under 35 U.S.C. 154(b) by 358 days.

(21) Appl. No.: 16/855,581

(22) Filed: Apr. 22, 2020

(65) Prior Publication Data

US 2020/0283585 A1 Sep. 10, 2020

Related U.S. Application Data

(62) Division of application No. 15/909,736, filed on Mar. 1, 2018, now Pat. No. 10,669,385.

(Continued)

(51) Int. Cl.
*B05C 5/02* (2006.01)
*B05C 9/12* (2006.01)
(Continued)

(52) U.S. Cl.
CPC .............. *C08J 3/124* (2013.01); *B05C 3/02* (2013.01); *B05C 5/02* (2013.01); *B05C 9/12* (2013.01);
(Continued)

(58) Field of Classification Search
None
See application file for complete search history.

(56) References Cited

U.S. PATENT DOCUMENTS 3,436,243 A * 4/1969 Gerhard ............... C08J 3/124
428/407
3,830,943 A * 8/1974 Hix ...................... A23P 10/20
426/453
(Continued)

FOREIGN PATENT DOCUMENTS

CN 101351315 A 1/2009
CN 101591447 A 12/2009
(Continued)

OTHER PUBLICATIONS

Office Action received for European Patent Application No. 18711208. 1, dated Jul. 21, 2020, 3 pages.
(Continued)

*Primary Examiner* — Binu Thomas
(74) *Attorney, Agent, or Firm* — Shook, Hardy & Bacon, L.L.P.

(57) ABSTRACT

Rubber pellets are coated with an anti-tack material. The anti-tack material may be comprised of a metallic stearate, such as magnesium stearate. The coated rubber pellets are loaded on to a rotational conveyance mechanism that rotates at a speed and radial amount to provide an interaction time between the rubber pellets and the anti-tack material. The coated rubber pellets may then be dried in a centrifuge dryer having a plurality of angled fins extending from a rotational shaft.

20 Claims, 5 Drawing Sheets

Related U.S. Application Data (60) Provisional application No. 62/466,119, filed on Mar. 2, 2017.

(51) Int. Cl.
*C08J 3/12* (2006.01)
*C08J 7/06* (2006.01)
*B29B 9/16* (2006.01)
*C08L 21/02* (2006.01)
*B05C 3/02* (2006.01)

(52) U.S. Cl.
CPC ............... *B29B 9/16* (2013.01); *C08J 3/128* (2013.01); *C08J 7/065* (2013.01); *C08L 21/02* (2013.01); *B29B 2009/163* (2013.01); *C08J 2321/00* (2013.01); *C08J 2321/02* (2013.01)

(56) References Cited

U.S. PATENT DOCUMENTS

| | | | |
|---|---|---|---|
| 3,935,124 A | | 1/1976 | Thene et al. |
| 3,989,473 A | * | 11/1976 | Henderson ............... C09C 1/58 209/291 |
| 4,483,886 A | * | 11/1984 | Kowalski ................. C08J 3/124 427/398.1 |
| 5,041,251 A | * | 8/1991 | McCoskey ................ B29B 9/16 427/430.1 |
| 5,938,994 A | * | 8/1999 | English ................. B29C 48/767 264/102 |
| 2004/0209082 A1 | * | 10/2004 | Lee ........................ A23G 4/025 428/407 |
| 2009/0062427 A1 | * | 3/2009 | Tornow ................. B29C 44/043 524/543 |
| 2012/0053278 A1 | * | 3/2012 | Malucelli ................. B29B 9/16 210/143 |
| 2012/0088105 A1 | | 4/2012 | Chiba et al. |
| 2015/0119517 A1 | | 4/2015 | Wilson, III et al. |
| 2015/0135645 A1 | * | 5/2015 | Colls ...................... B29B 9/065 53/113 |
| 2018/0251608 A1 | | 9/2018 | Jurkovic et al. |

FOREIGN PATENT DOCUMENTS

| | | |
|---|---|---|
| CN | 101718486 A | 6/2010 |
| DE | 3043730 A1 | 8/1981 |
| EP | 1386939 A1 | 2/2004 |
| TW | I504617 B | 10/2015 |

OTHER PUBLICATIONS

"Anti-Tacks", Hallstar, XP002780378, Available online at: <www.hallstar.com/webfoo/wp-content/uploads/ANTITACK.pdf>, Dec. 27, 2016, 17 pages.

Intention to Grant received for European Patent Application No. 18711208.1, dated Apr. 13, 2021, 8 pages.

* cited by examiner

RUBBER PELLET TREATMENT

CROSS-REFERENCE INFORMATION

This application entitled "Rubber Pellet Treatment" is a divisional of U.S. Nonprovisional application Ser. No. 15/909,736, entitled "Rubber Pellet Treatment," and filed on Mar. 1, 2018, which claims the benefit of U.S. Provisional Application No. 62/466,119, entitled "Rubber Pellet Treatment," and filed Mar. 2, 2017, which are each incorporated by reference in their entireties.

BACKGROUND

Uncured rubber is inherently tacky. As uncured rubber physically interacts with other uncured rubber elements, such as pellets, the individual uncured rubber elements may stick to each other. As the individual pellets stick to each other, they may clump and be difficult for future processing. As such, uncured rubber may be treated with an anti-tack material to reduce the tackiness of the uncured rubber elements. However, if anti-tack material is not applied appropriately, it can have adverse impact to the uncured rubber when later formed into an intended article.

SUMMARY

Aspects hereof contemplate systems and methods for coating rubber pellets with an anti-tack material. The anti-tack material may be comprised of a metallic stearate, such as magnesium stearate. The coated rubber pellets are loaded on to a rotational conveyance mechanism that rotates at a speed and radial amount to provide an interaction time between the rubber pellets and the anti-tack material. The coated rubber pellets may then be dried in a centrifuge dryer having a plurality of angled fins extending from a rotational shaft.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Rubber products, such as rubber pellets for use in subsequent manufacturing processes, inherently have a tendency to stick to one another. As a result, aspects hereof contemplate applying an anti-tack composition to the rubber in an effort to reduce clumping of individual rubber products. However, application of anti-tack compositions can have an adverse impact on a resulting product formed from the treated rubber. For example, the anti-tack composition, if not controlled, can cause physical characteristics and aesthetic characteristics that are not desired in the final product. Therefore, process constraints and material selection is controlled to limit unintended results from use of the anti-tack composition.

Aspects hereof contemplate uncured rubber pellets being coated in a liquid anti-tack composition. The anti-tack composition may be comprised of a metallic stearate, such as magnesium stearate, calcium stearate, or zinc stearate, for example. The anti-tack composition may be a water-dispersible composition having a range of 0.1% to 0.5% of solids. Subsequent to coating the rubber pellets with the liquid anti-tack composition, the anti-tack solution is dried with the rubber pellets. The drying may include transferring the coated rubber pellets from a coating machine to a rotary conveyance machine by a gravity feeding drain plate. The rotary conveyance machine is able to control a drying time while minimizing a production footprint of the system. The rotary conveyance machine rotates at a pre-determined rate to allow the anti-tack composition to interact sufficiently, but not too much, with the rubber pellets before being transferred to a centrifugal dryer. The centrifugal dryer, in an exemplary aspect, is comprised of a plurality of fins extending outwardly from a central rotational shaft. Selection of the anti-tack composition and the rotary conveyance machine rotational speed and the resulting holding time for the coated rubber pellets are coordinated to result in a sufficiently treated rubber pellet that is still capable of exhibiting intended physical and aesthetic characteristics when used to form a subsequent article.

An additional aspect herein is directed to a method of treating rubber pellets, such as recently formed rubber pellets that are substantially uncured, for a reduction in tackiness. The method is comprised of coating the rubber pellets with a liquid anti-tack material forming coated pellets. The method may continue with loading the coated pellets on a rotary conveyance machine at a first location of the rotary conveyance machine and then conveying the coated pellets on the rotary conveyance machine for a time between 1 minute and 8 minutes to allow an intended interaction time between the anti-tack material and the rubber pellets based on a selection of the anti-tack material in an exemplary aspect. The method may continue with dispensing the coated pellets from the rotary conveyance machine at a second location. The method also may include drying the coated pellets in a centrifuge dryer having a plurality of fins extending outwardly from a shaft defining a central rotational axis.

Additional exemplary aspects contemplate a system of treating rubber pellets for a reduction in tackiness. The system may include a coating machine. The coating machine includes a liquid reservoir of anti-tack material. The antitack material is a composition comprised of metallic stearates, in an exemplary aspect. The system further includes a drain plate having a plurality of apertures extending there through that extend to a rotational conveyance machine. The rotational conveyance machine is comprised of a circular surface rotating at a rate between 1 revolution per minute ("RPM") and 0.125 RPM. The drain plate is positioned above the circular surface at a first location of the circular surface. The system may also include a dispensing component positioned above the circular surface at a second location of the circular surface. The first location and the second location of the circular surface are radially offset by at least 190 degrees in an exemplary aspect. The system may also be comprised of a centrifuge dryer having a plurality of fins extending outwardly from a central rotational axis about which a shaft rotates to which the fins are attached. The centrifuge dryer is positioned in a process flow direction subsequent to the rotational conveyance machine.

Figure 1:
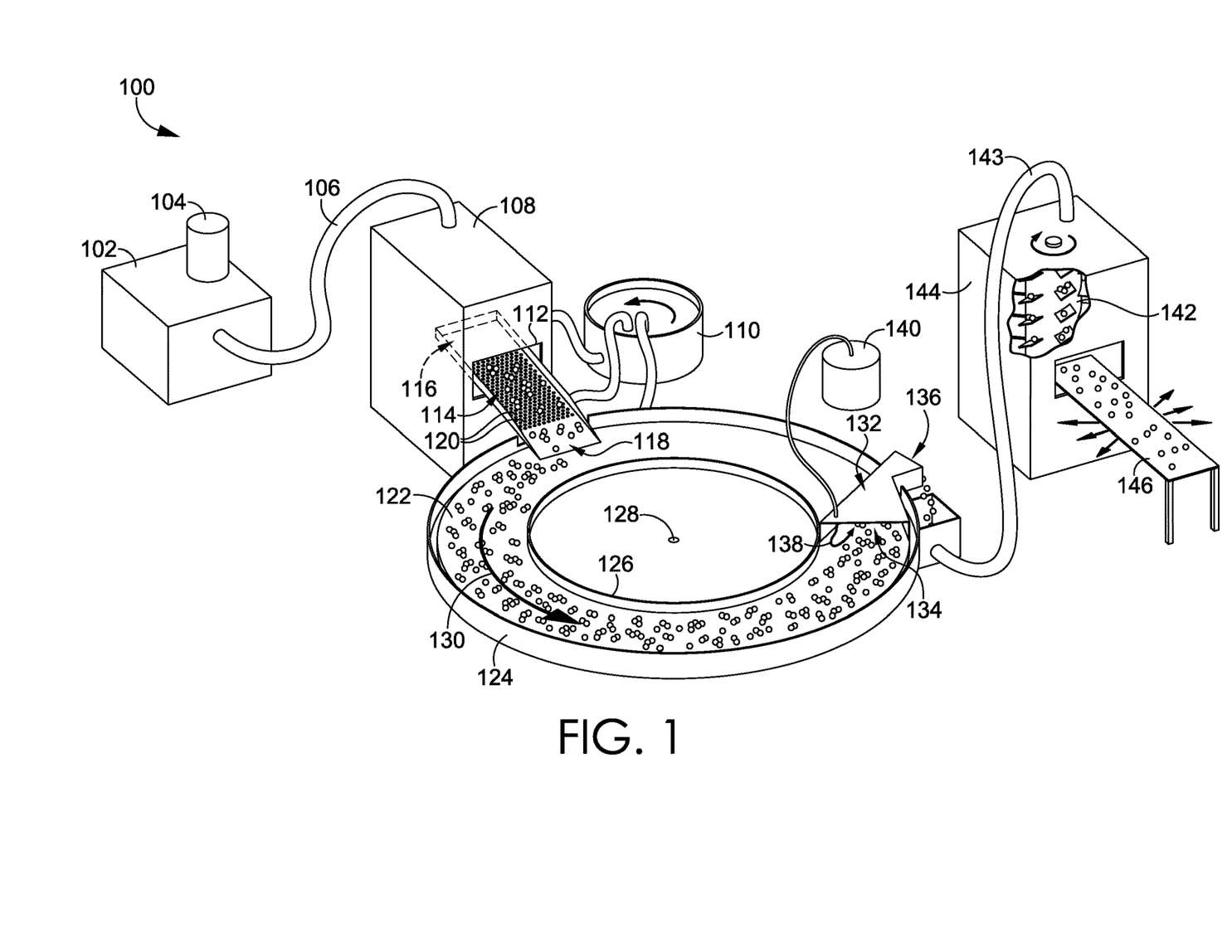
FIG. 1 depicts an exemplary system for treating rubber with an anti-tack material, in accordance with aspects hereof.

FIG. 1 depicts a system 100 for reducing tackiness of rubber pellets, in accordance with aspects hereof. In an exemplary aspect, the system 100 is comprised of a pelletizer 102, a coating machine 108, a drain plate 114, a rotational conveyance machine 122, and a centrifuge dryer 144. While the various components of the system 100 are depicted generally, it is understood that any configuration and positioning may be implemented. Further, while specific components are provided in connection with the system 100, one or more of the components may be omitted or additional components may be implemented. Further, it is contemplated that any number of the one or more components may be utilized in any combination in exemplary aspects.

The pelletizer 102 is effective to form rubber pellets. For example, the pelletizer may be comprised of an extruder 104 able to extrude rubber pellets from rubber stock. A rubber pellet is a discrete rubber element intended to be used in a subsequent manufacturing processes, such as forming an article of footwear sole component. A rubber pellet may be a cylindrical or spherical shape, in an exemplary aspect. The rubber pellets may be formed from an uncured rubber. As uncured rubber may exhibit undesired tackiness, aspects herein contemplate applying an anti-tack material to the uncured rubber pellets to reduce cohesion of the rubber pellets to one another, which can aid in efficient manufacturing of the pellets at later stages.

Uncured rubber, as used herein, is rubber that has yet to be vulcanized or fully vulcanized. A vulcanization process can add stability to the rubber material. This may be accomplished, in part, though a cross linking of long polymer chains of the rubber. Vulcanization may be accomplished with the introduction of sulfur or other curatives or accelerators.

Once formed, the uncured rubber pellets are transferred through a connector 106. The connector 106 may be any transfer means, such as a conveyor, a vacuum tube, or a fluid-filled connection. The connector 106 is effective to transfer the rubber pellets from the pelletizer 102 or any other pellet source to the coating machine 108.

The coating machine 108 is effective to coat the rubber pellets with at least an anti-tack material. The coating machine 108 may use a dip tank, a spray container, a dust box, or the like to apply the anti-tack material to the rubber pellets. In an exemplary aspect the coating machine 108 is a liquid-based applicator. As such, the rubber pellets are exposed to an aqueous solution into which the anti-tack material is dispersed, suspended, or floating. The solution may be a dip tank through which the rubber pellets are submerged or otherwise passed to cause a coating of the solution and anti-tack material onto one or more surfaces of the rubber pellets. As the anti-tack material may be a solid suspended in the aqueous solution, the water portion may be removed through subsequent drying and curing processes, as will be discussed hereinafter.

The coating machine 108 includes an outlet 112 from which anti-tack material coated rubber pellets emerge. The coated rubber pellets may travel down a drain plate 114 from a proximal end 116 to a distal end 118. The drain plate 114 is comprised of one or more apertures 120. The apertures 120 provide a first anti-tack material recovery option. For example, the drain plate 114 may be positioned such that the proximal end 116 is higher than the distal end 118, as will be seen in better detail in FIG. 3 hereafter. This downward slope allows for the drain plate 114 to be a gravity-fed movement mechanism for transporting the coated pellets from the coating machine 108 to a next process, such as the rotational conveyance machine 122. The drain plate may also have a vibration generator that causes a vibrational character to the drain plate, which may enhance the movement of coated rubber pellets along the drain plate 114. As the recently coated rubber pellets traverse the drain plate 114, excess anti-tack material may drain through the one or more apertures 120 to be collected by an anti-tack collection system 110. The captured anti-tack material may be recycled for use in the coating machine 108.

The rotational conveyance machine 122 is comprised of an inner perimeter 126 and an outer perimeter 124. The rotational conveyance machine 122 rotates about a rotational axis 128 in a direction of rotation 130. The rotational conveyance machine 122 is used in place of a linear conveyance mechanism, in an exemplary aspect, as it provides for a smaller footprint within the manufacturing facility and allows for a rotational direction change of the rubber pellets. The rotational conveyance machine 122 is contemplated as having a rubber pellet conveyance area that is a ring-like structure contained between the inner perimeter 126 and the outer perimeter 124.

Based on the rubber pellet structure, the anti-tack material composition, and the intended final use of the rubber pellets, a rotational speed of the rotational conveyance machine 122 is set. For example, the rotational conveyance machine 122 may have a least 0.125 revolutions per minute ("RPM") while being less than 0.75 RPM. This rate of rotation provides a sufficient curing time for the anti-tack material to interact with the rubber pellets without introducing sufficient angular velocity to cause unintended movement of the rubber pellets to the outer perimeter 124 and without allowing for an inefficient curing process from a time perspective. In an alternative manner, it is contemplated that the rotational conveyance machine 122 maintains the coated rubber pellets before dispensing them for a time range of 1 minute up to 8 minutes. Less than 1 minute may not provide sufficient interaction between the coated rubber pellets and the contemplated anti-tack material. In an exemplary aspect, the rotational conveyance machine 122 rotates at about 0.15 to 0.25 RPM.

At a second location of the rotational conveyance machine 122, a dispensing component 132 removes the coated rubber pellets from the rotational conveyance machine 122. Therefore, the coated rubber pellets are introduced to the rotational conveyance machine 122 at a first location proximate the distal end 118 of the drain plate 114 and the coated rubber pellets are removed from the rotational conveyance machine 122 at the second location. The first location and the second location 134 on the rotational conveyance machine 122 may be radially offset by at least 190 degrees. The at least 190 degrees allows the RPM to be within the provided range while still achieving the provided interaction times. Additionally, the greater than 190 degrees for a rotational direction change for purposes of the manufacturing footprint optimization. Additionally, it is contemplated that the first location and the second location are offset by at least 1.1 Radians.

The dispensing component 132 is comprised of a diversion element 136 effective to translate the rotational energy of the rotational conveyance machine 122 to a lateral movement of the rubber pellets. This conversion of energy rotational force to lateral movement force allows for the rubber pellets to move towards the outer perimeter 124 from a more interior portion on the rotational conveyance machine 122, such as the inner perimeter 126. In further support of removing the rubber pellets from the rotational conveyance machine 122, an air nozzle may direct pressurized air in a direction from an interior radius towards an exterior radius, such as the inner perimeter 126 toward the outer perimeter 124. The air nozzle 138 may be supplied by a fluidly coupled compressor 140. The pressurized air may also be effective for removing excess anti-tack material on the rotational conveyance machine 122 and/or the coated rubber pellets. Anti-tack material that is dislodged from the rotational conveyance machine 122 and/or the coated rubber pellets may be captured by the dispensing component, such as a cover of the dispensing component, and provided to the anti-tack collection system 110 in an exemplary aspect to increase efficient use of the anti-tack material.

The coated rubber pellets are transferred from the rotational conveyance machine 122 to the centrifuge dryer 144 by a centrifuge connector 143. Similar to the connector 106, the centrifuge connector 143 may be any transfer means, such as a conveyor or a vacuum transfer hose. The centrifuge connector 143 is effective to transfer the coated rubber pellets from the rotational conveyance machine 122 to the centrifuge dryer 144.

The centrifuge dryer 144 (or generally referenced as a dryer) is a dryer effective to remove fluid, such as excess liquid anti-tack material from the coated rubber pellets. The centrifuge dryer 144 is comprised of a rotational shaft 142 having a plurality of angled fins thereon that are effective to agitate and dry the coated rubber pellets, as will be depicted in FIG. 4 in greater detail. While the centrifuge connector 143 is depicted as entering a top portion of the centrifuge dryer 144, it is understood that the centrifuge connector 143 may instead deposit the coated rubber pellets at any location, such as a bottom portion of the centrifuge dryer 144. For example, the centrifuge dryer 144 may rotate the rubber pellets until they reach an upper portion of the rotational shaft 142 as a means of determining when a sufficient amount of anti-tack material has been removed as evidenced by the ability of the rubber pellets to rise up the rotational shaft 142 and associated fins. A centrifuge dryer, in an exemplary aspect, allows for drying of rubber pellets without affecting the thermal characteristics of the rubber. For example, as rubber is heated, it may have a greater affinity to be tacky, which is counterproductive for an anti-tack system, such as the system 100.

The system 100 may be further comprised of a transfer mechanism 146. The transfer mechanisms may be effective for transferring the dried coated rubber pellets from the centrifuge dryer 144. The transfer mechanism 146 may be a conveyor and/or a vibration mechanism.

While specific components are depicted and discussed, it is contemplated that alternatives may be used in connection with the system 100. For example, instead of a centrifuge dryer, a microwave or thermal heater may be used.

Figure 2:
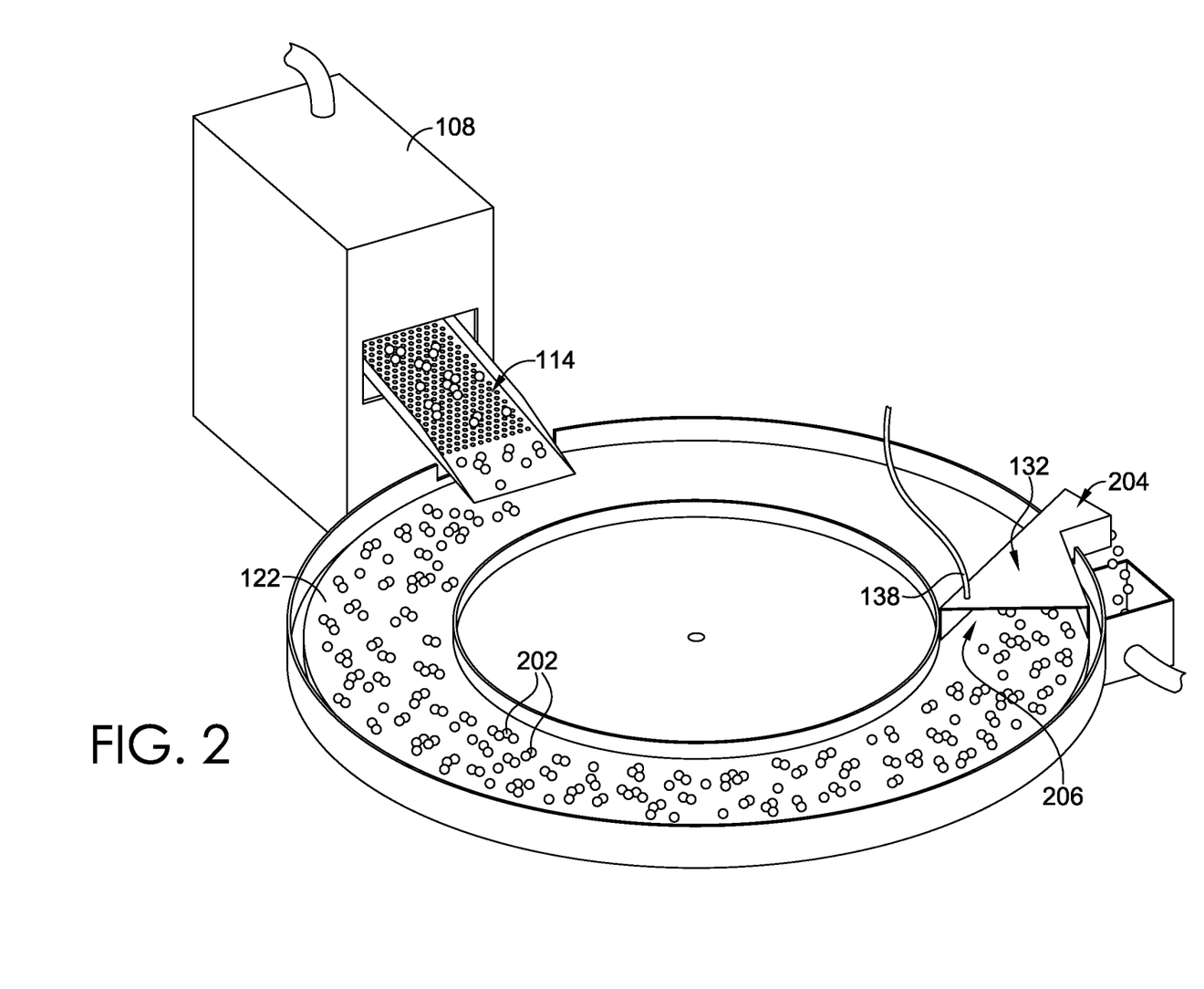
FIG. 2 depicts a zoomed view of a portion of the system from FIG. 1, in accordance with aspects hereof.

FIG. 2 depicts a zoomed perspective of the coating machine 108 and the rotational conveyance machine 122, in accordance with aspects hereof. Specifically, pellets 202 are depicted as transferring from the coating machine 108 down the drain plate 114 to the rotational conveyance machine 122. The pellets 202 are then dispensed by the dispensing component 132 that diverts the pellets 202 from an internal portion 206 to and external portion 204. This diversion may be in part accomplished through a translation of rotational force supplied by the rotational conveyance machine 122. Additionally, the compressed air supplied by the air nozzle 138 may be effective to move the pellets 202 towards the external portion 204.

Figure 3:
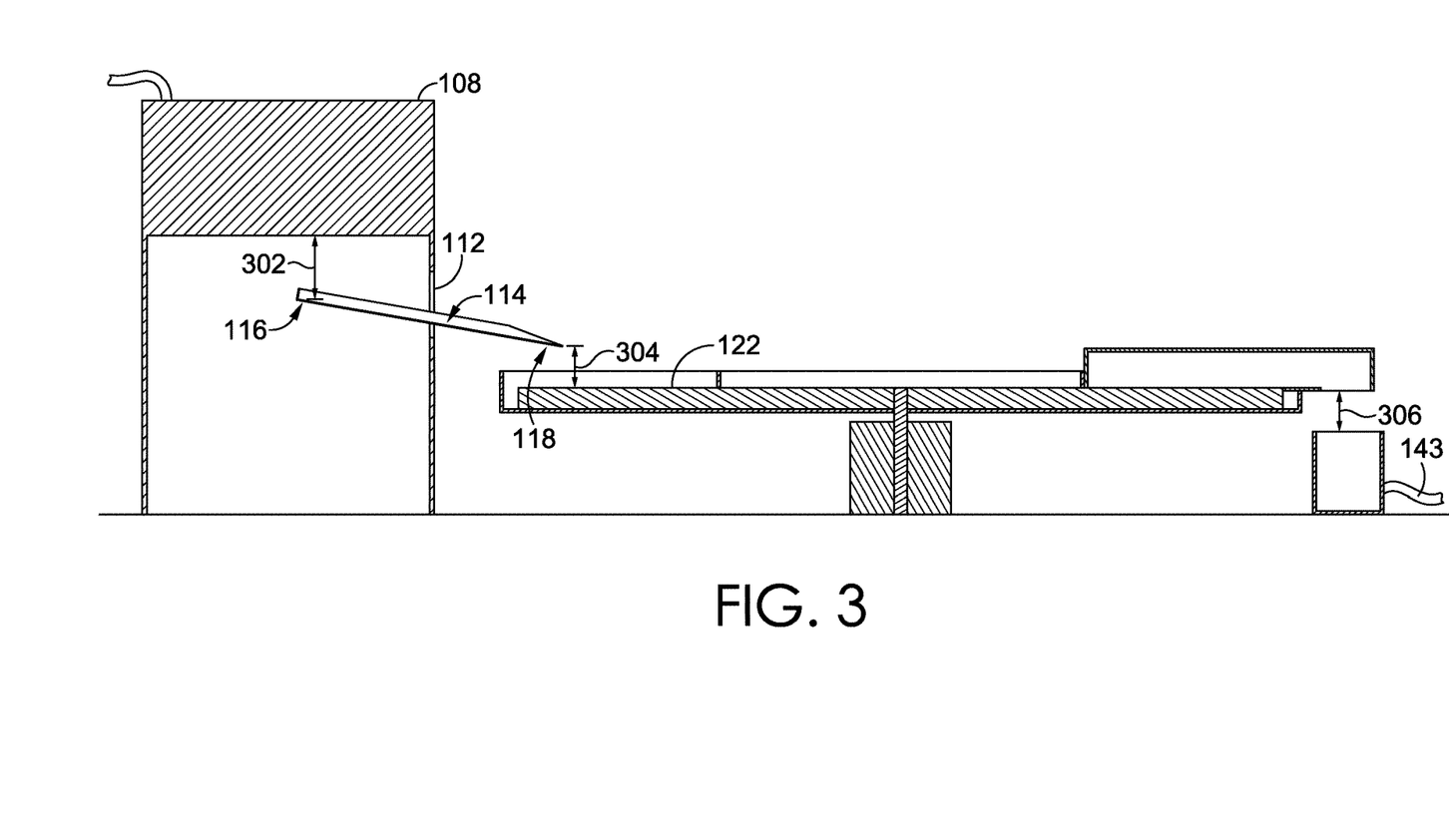
FIG. 3 depicts a side profile of the system provided in FIG. 2, in accordance with aspects hereof.

FIG. 3 depicts a side profile of a portion of the system 100, in accordance with aspects hereof. Specifically, relative heights and angles of the coating machine 108, the drain plate 114, the rotational conveyance machine 122, and the centrifuge connector 143 are provided. For example, the proximal end 116 of the drain plate 114 is a distance 302 below an exit point from a submersion or other coating portion of the coating machine 108. The drain plate 114 is angled such that gravity may assist in the transfer of coated rubber pellets toward the distal end 118. The distal end 118 is above the rotational conveyance machine 122 by a distance 304. By having the distal end 118 above the rotational conveyance machine 122, coated rubber pellets may be deposited from the drain plate 114 to the rotational conveyance machine 122 with minimal additional input energy. Similarly, the coated rubber pellets may be dispensed or removed from the rotational conveyance machine 122 at the centrifuge connector 143 with minimal additional input energy as the distance 306 allows for gravitational energy to be leveraged.

Figure 4:
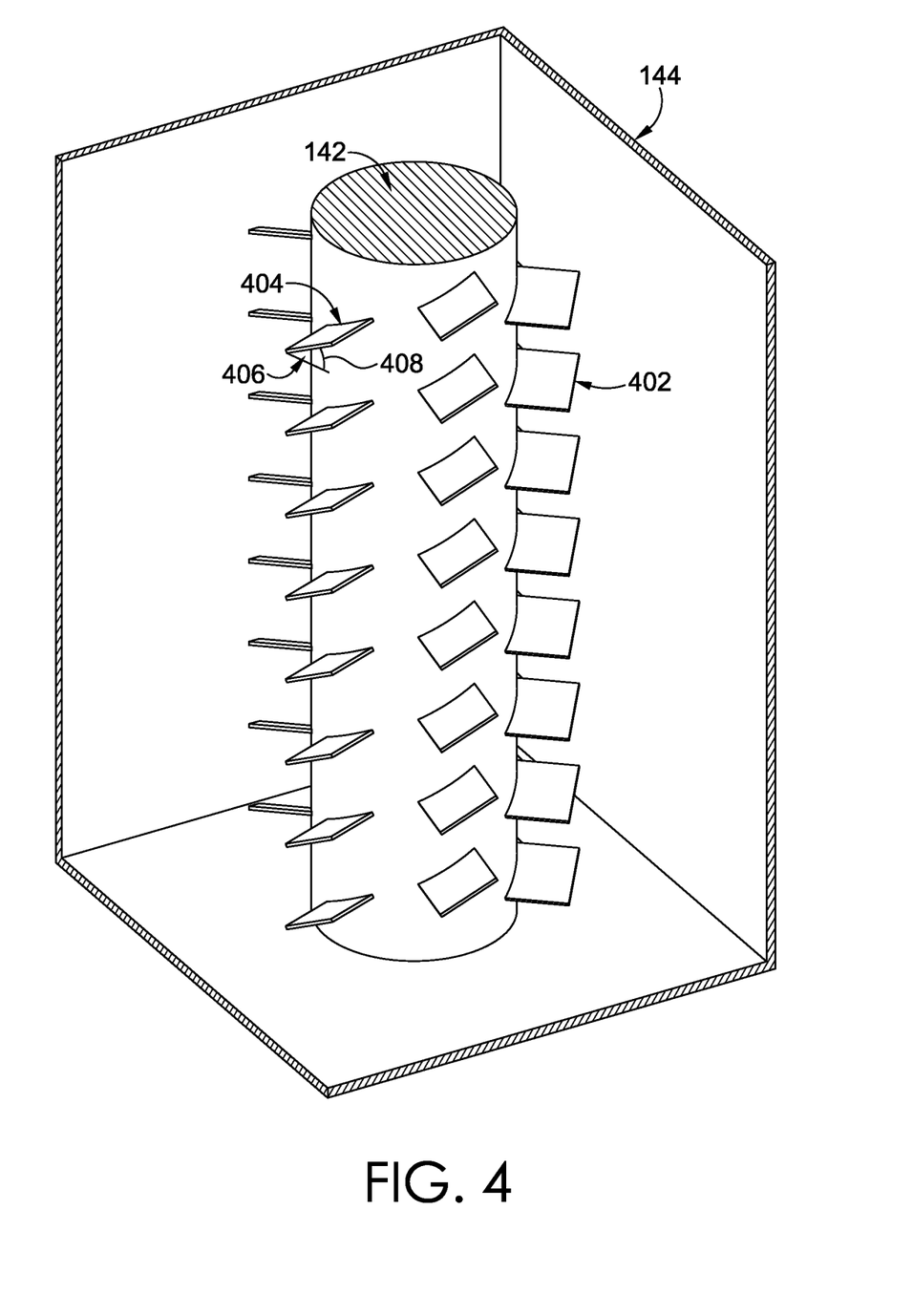
FIG. 4 depicts a cut view of a centrifuge dryer, in accordance with aspects hereof.

FIG. 4 depicts an exposed simplified perspective of the centrifuge dryer 144, in accordance with aspects hereof. As seen in FIG. 4, the centrifuge dryer 144 is comprised of the rotational shaft 142 having a plurality of fins 402 coupled thereto. The fins 402 may be arranged having an angular orientation that creates an upward movement of material and/or air when the rotation is in a clockwise manner as depicted in FIG. 4. For example, an angle 404 is depicted from a horizontal plane 406 for a particular fin 408. It is contemplated that all fins have a similar angle 404 in an exemplary aspect. In an alternative, it is contemplated that as fins extend along a longitudinal axis of the rotational shaft, the angle changes. For example, fins closer to the top of the rotational shaft 142 may have a greater or a lesser angle than fins at a bottom of the rotational shaft 142.

While not depicted, it is contemplated that the rotational shaft 142 and associated fins may be encased in a screen, such as a tubular sleeve that surrounds, without contacting, the rotational shaft and fins. The screen may be effective to keep the coated rubber pellets in contact with the fins while allowing the rotational force of the rotational shaft and fins to expel liquid, such as the anti-tack material, through the screen. In this way, the rotational forces that are effective to remove excess fluid from the individual rubber pellets through the screen is resisted by the screen to maintain the pellets within a volume that allows them to interact with the rotational shaft and fins. Stated differently, the screen is effective to keep the rubber pellets in contact with the rotational shaft and fins while still allowing the liquid to move away and out of interaction with the rotational shaft and fins, in an exemplary aspect.

Figure 5:
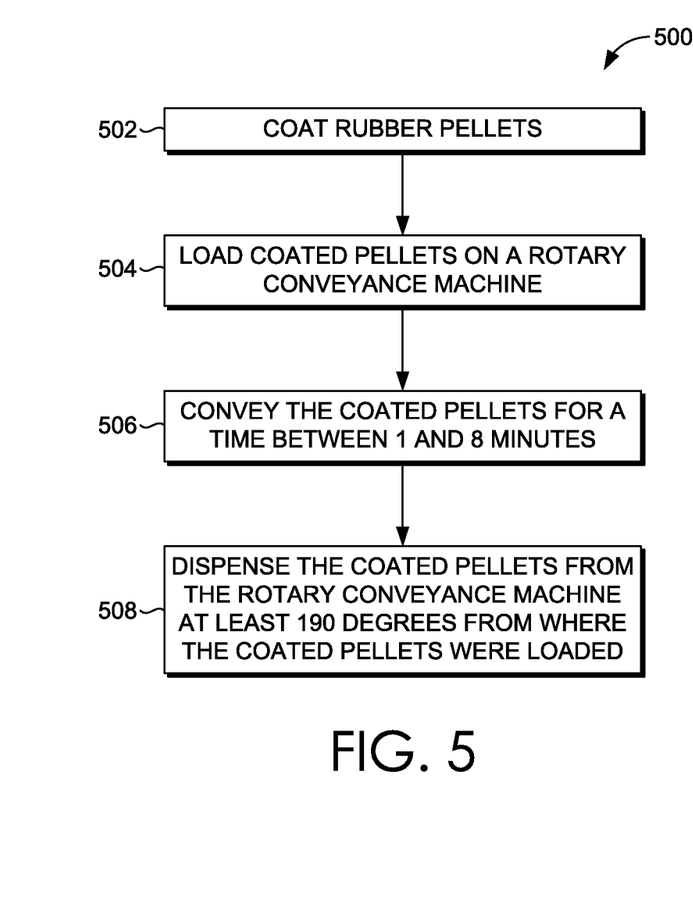
FIG. 5 depicts an exemplary method diagram for treating rubber, in accordance with aspects hereof.

FIG. 5 depicts an exemplary method 500 for treating rubber pellets with an anti-tack material, in accordance with aspects hereof. At a block 502, rubber pellets are coated with an anti-tack material, such as a composition comprising metallic stearates. The composition may be an aqueous solution having 0.1% to 0.5% solids. The composition may be further comprised of surfactants, anti-foam agents, and water, for example. The rubber pellets, which may be any size or shape, may be coated by a dipping method or spraying method, for example.

At a block 504, the coated pellets are loaded on a rotational conveyance machine. The loading may be accomplished, at least in part, with a drain plate to remove an initial portion of excess anti-tack liquid material. For example, the coated rubber pellets may be vibrated down a sloped drain plate having a plurality of drain apertures extending there through. The drain apertures may be smaller than the pellet size to prevent a loss in pellets while allowing for a capture of the excess anti-tack material.

At a block 506, the coated pellets are conveyed on the rotational conveyance machine for a time between 1 and 8 minutes. The conveyance time allows for an appropriate curing and interaction between the anti-tack material and the rubber pellets. Time less may not allow for sufficient coverage and maintenance of the anti-tack material on the rubber pellets to achieve a threshold level of anti-tack. A conveyance time longer than 8 minutes, in an exemplary aspect, may not significantly increase anti-tack properties while inserting inefficiencies into the overall process.

At a block 508, the coated pellets are dispensed from the rotational conveyance machine at at least 190 degrees from where the pellets where loaded onto the rotational conveyance machine.

It is contemplated that additional steps may be included with the method 500. For example, additional drying may be performed by a centrifuge dryer.

Figure 6:
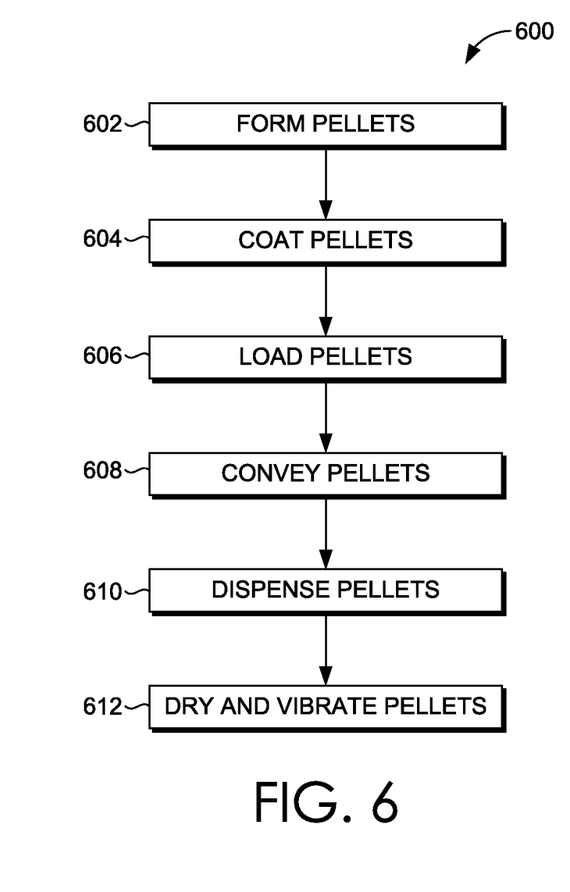
FIG. 6 depicts an alternative method diagram for treating rubber, in accordance with aspects hereof.

FIG. 6 depicts a method 600 for treating rubber pellets with anti-tack material, in accordance with aspects hereof. At a block 602, a pellet is formed. The pellet may be formed by a pelletizer. The pelletizer may implement an extruder to form the pellet. The pellet may be an uncured rubber that is susceptible to sticking with other recently-form rubber pellets. As such, aspects herein contemplate treating the rubber pellet with an anti-tack material.

At a block 604, the pellets are coated with an anti-tack material, such as a composition comprising metallic stearates, like magnesium stearate. At a block 606, the pellets are loaded on a rotational conveyance machine after being coated. The pellets are then conveyed from by the rotational conveyance machine, as provided in a block 608. The conveyance provides a time for interaction between the rubber pellets and the anti-tack material prior to dispensing the pellets from the rotational conveyance mechanism, as provided in a block 610. The method 600 also includes drying the rubber pellets after having been conveyed by the rotational conveyance machine. The drying may be accomplished by a non-thermal process, such as a centrifuge dryer. The centrifuge dryer may rapidly spin the rubber pellets such that excess liquid is pulled from the rubber pellet surfaces. It is also con template that the dried pellets may then be vibrated to move the pellets and to reduce sticking between individual pellets, in an exemplary aspect.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. A system of treating rubber pellets for a reduction in tackiness, the system comprising:
   a coating machine, the coating machine comprising a liquid reservoir of an anti-tack material, wherein the anti-tack material is a composition comprised of metallic stearates;
   a drain plate having a plurality of apertures extending there through;
   a rotational conveyance machine comprising a circular surface rotating at a rate from 1 revolution per minute ("RPM") to 0.125 RPM, wherein the drain plate is positioned above the circular surface at a first location of the circular surface;
   a dispensing component positioned above the circular surface at a second location of the circular surface, wherein the first location and the second location of the circular surface are radially offset by at least 190 degrees; and
   a centrifuge dryer having a plurality of fins extending outwardly from a central rotational axis, wherein the centrifuge dryer is positioned in a process flow direction subsequent to the rotational conveyance machine.

2. The system of claim 1 further comprising a pelletizer, the pelletizer includes an extruder that forms rubber pellets that pass through the system.

3. The system of claim 1, wherein the dispensing component is comprised of a diversion element having a distal end and a proximal end, wherein the diversion element is angularly offset with the distal end in a farther direction of rotation than the proximal end.

4. The system of claim 3, wherein the dispensing component further comprises an air nozzle, the air nozzle positioned on rotation-ward side of the diversion element, the air nozzle positioned to direct air from an internal portion towards an external portion of the circular surface of the rotational conveyance machine.

5. The system of claim 1 further comprising:
   the centrifuge dryer positioned in a rubber pellet flow direction subsequent to the dispensing component; and
   a vibration table positioned in the rubber pellet flow direction subsequent the centrifuge dryer.

6. The system of claim 1, wherein the coating machine outputs rubber pellets at a height above a receiving end of the drain plate, and wherein a dispensing end of the drain plate is above the circular surface.

7. A system of treating rubber pellets for a reduction in tackiness, the system comprising:
   a coating machine, the coating machine comprising a liquid reservoir of an anti-tack material;
   a drain plate having a plurality of apertures extending there through;

a rotational conveyance machine comprising a circular surface rotating at a rate of at least 0.125 revolution per minute ("RPM"), wherein the drain plate is positioned above the circular surface;

a dispensing component positioned above the circular surface of the rotational conveyance machine; and a centrifuge dryer positioned in a process flow direction subsequent to the rotational conveyance machine.

8. The system of claim 7, the anti-tack material is a composition comprised of metallic stearates.

9. The system of claim 8, wherein the metallic stearates is comprised of magnesium stearate.

10. The system of claim 7, wherein the circular surface of the rotational conveyance machine rotates at a rate that is less than 1 RPM.

11. The system of claim 7, wherein the drain plate is further positioned at a first location of the circular surface, wherein the dispensing component is further positioned at a second location of the circular surface, and wherein the first location and the second location of the circular surface are radially offset by at least 190 degrees.

12. The system of claim 7, wherein the centrifuge dryer has a plurality of fins extending outwardly from a central rotational axis.

13. The system of claim 7, wherein the anti-tack material is comprised of a solid content from 0.1% to 0.5%.

14. The system of claim 7 further comprising a pelletizer, the pelletizer includes an extruder that forms rubber pellets that pass through the system.

15. The system of claim 7 further comprising:
the centrifuge dryer positioned in a rubber pellet flow direction subsequent to the dispensing component; and
a vibration table positioned in the rubber pellet flow direction subsequent the centrifuge dryer.

16. The system of claim 7, wherein the coating machine outputs rubber pellets at a height above a receiving end of the drain plate, a dispensing end of the drain plate is above the circular surface.

17. A system of treating rubber pellets for a reduction in tackiness, the system comprising:
a coating machine, the coating machine comprising a liquid reservoir of an anti-tack material;
a drain plate having a plurality of apertures extending there through;
a rotational conveyance machine comprising a circular surface rotating at a rate of at least 0.125 revolution per minute ("RPM"), wherein the drain plate is positioned above the circular surface;
a dispensing component positioned above the circular surface of the rotational conveyance machine; and
a dryer positioned in a process flow direction subsequent to the rotational conveyance machine.

18. The system of claim 17, wherein the circular surface of the rotational conveyance machine rotates at a rate that is less than 1 RPM.

19. The system of claim 17, wherein the dispensing component is comprised of a diversion element having a distal end and a proximal end, wherein the diversion element is angularly offset with the distal end in a farther direction of rotation than the proximal end.

20. The system of claim 19, wherein the dispensing component further comprises an air nozzle, the air nozzle positioned on rotation-ward side of the diversion element, the air nozzle positioned to direct air from an internal portion towards an external portion of the circular surface of the rotational conveyance machine.

* * * * *